No. 805,789.    PATENTED NOV. 28, 1905.
W. S. FRARY & J. L. KNIEPER.
CULTIVATOR.
APPLICATION FILED SEPT. 8, 1904.

Witnesses
Edward R. Monroe.
Mary S. Tooker.

Inventors
Warren S. Frary
Julius L. Knieper
By Edward Taggart
Attorney.

UNITED STATES PATENT OFFICE.

WARREN S. FRARY AND JULIUS L. KNIEPER, OF GRAND RAPIDS, MICHIGAN, ASSIGNORS TO JULIUS L. KNIEPER, OF GRAND RAPIDS, MICHIGAN.

CULTIVATOR.

No. 805,789.  Specification of Letters Patent.  Patented Nov. 28, 1905.

Application filed September 3, 1904. Serial No. 223,686.

*To all whom it may concern:*

Be it known that we, WARREN S. FRARY and JULIUS L. KNIEPER, citizens of the United States, residing at Grand Rapids, in the county of Kent and State of Michigan, have invented new and useful Improvements in Cultivators, of which the following is a specification.

This invention relates to certain new and useful improvements in choppers, and especially to choppers used for the purpose of blocking out the rows of plants which have been sown or drilled; and the invention consists in the combination and arrangement of parts hereinafter particularly described and claimed.

The objects of the invention are, first, to produce a machine that will accurately and rapidly remove a portion of the plants drilled in rows, so as to leave the remainder in the proper position to produce the best results, and the same is especially adapted for use in cultivating sugar-beets; second, to furnish in connection with a machine of the class described means for automatically adjusting the knives or cutters which remove a portion of the plants from the row; third, other objects hereinafter pointed out and described. These objects we accomplish by means of the mechanism illustrated in the accompanying drawings, in which—

Figure 1:
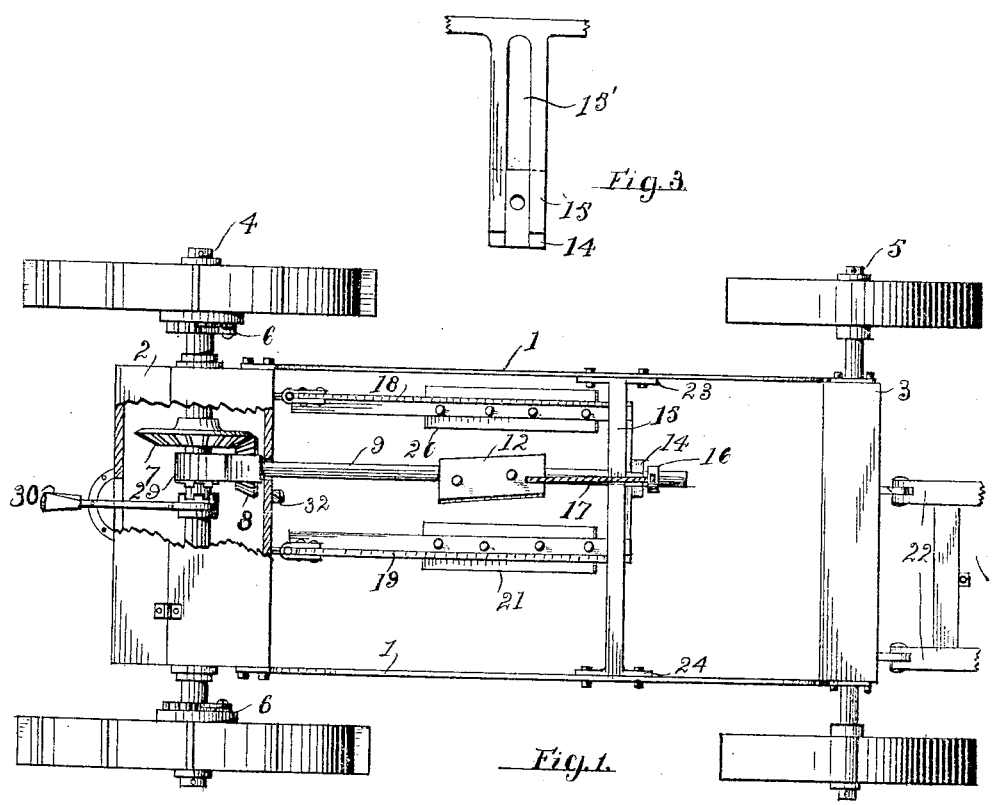
Figure 2:
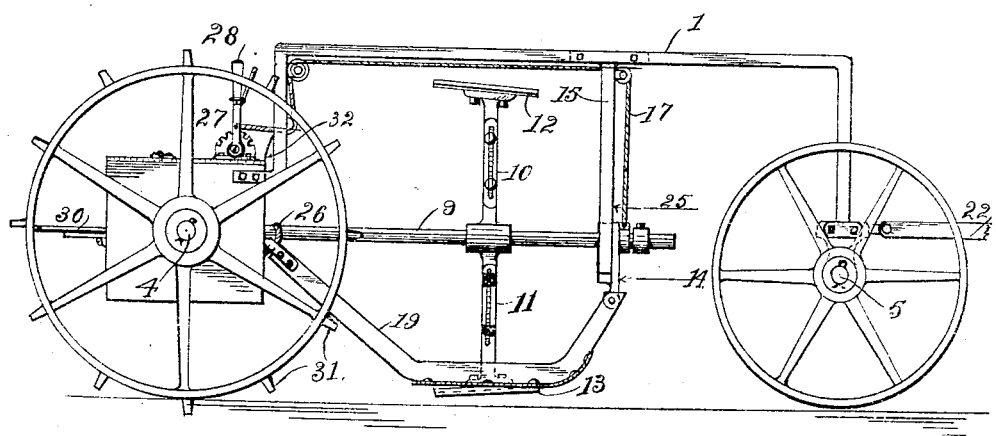

Figure 1 shows a plan view of a chopper constructed in accordance with our invention, with a portion of the frame cut away in order to show the driving mechanism which moves the arms carrying the cutters. Fig. 2 is a side elevation of the same, showing the position of one of the shoes which regulates the depth which the knife will enter the ground. Fig. 3 is a detail view of the slotted portion indicated by the arrow 25 in Fig. 2.

Similar numerals refer to similar parts throughout the several views.

1 1 are the side portions of the supporting-frame, which frame is supported upon bolsters 2 and 3, said bolsters being supported upon the axles of the chopper.

4 is the rear axle or driving-shaft, which operates the mechanism.

5 is the front axle.

6 6 are dogs engaging with suitable ratchets to prevent the rear driving-axle from being turned in a backward direction.

7 is a main driving-gear on the rear axle.

8 is a pinion on the shaft which revolves the cutter-knife arms, said shaft being shown by 9, and which is so secured to the rear axle that at its front end the knives supported thereon may be adjusted vertically.

10 and 11 are the knife-arms, which revolve with the shaft 9 and which carry the cutter-knives 12 and 13.

14 is a sliding frame which supports the bearing for the front end of the knife-shaft 9.

13' is a slotted guide or way, in which the frame 14 may be adjusted vertically.

16 is a collar on the shaft 9 for the purpose of retaining the same in its bearings, which bearings are in said sliding frame, above described.

17 is a cable, cord, or rope used for raising and lowering the front end of the shaft 9.

In order to automatically adjust the cutter-knives so as to operate automatically, we provide the frames 18 and 19, which are hooked near the rear end of the cultivator to the main frame and connected by suitable means to the front end of the shaft 9 by the slidable frame 14 and provided with the shoes 20 and 21. These shoes 20 and 21 are preferably made of thin metal and are adapted to slide along the surface of the ground, and inasmuch as they are connected to the front end of the frames 18 and 19, carrying the shaft 9, they automatically adjust the cutter-knives so that they will cut the required distance into the ground. The chopper is provided with suitable thills or shafts 22 for attaching a horse or horses to the chopper.

23 and 24 are fastening-plates used for securing the supporting-arm 15 to the frame.

26 represents hooks for supporting the side frames 18 and 19 to the main frame.

28 is a lever connected by the cable 17 to the front end of the cutter-shaft 9 and used for raising and lowering said shaft and adjusting the same to its required position.

29 is a yoke supporting the pinion 8 on the shaft 9, and thereby supporting the rear end of the shaft.

30 is a lever for throwing the gear-wheel 7 into and out of gear with the shaft.

31 represents sprockets or projections on the outside of the rear wheels of the cultivator, designed to prevent said wheels from slipping upon the ground.

32 is a standard supporting suitable pulleys over which the cord 17 runs. These pulleys, however, may be dispensed with without departing from the spirit of the invention.

In using our improved chopper the horse travels between the rows of plants. The wheels straddle the row of plants, and between the wheels and the row of plants are placed the regulating-shoes 20 and 21, carried by frames 18 and 19, which are connected to the shaft 9 and are adapted to contact with the ground and which will adjust automatically the depth to which the cutter shall enter the ground by the vertical movement of said frames. It is obvious that the shaft 9, carrying the cutters 12 and 13, being supported by the vertical movable frame, causes said cutters to be moved therewith, thereby automatically adjusting the said cutters to the irregularity of the surface of the ground traversed. As the cultivator is moved forward the shaft 9 revolves, and with it the arms 10 and 11, carrying the cutters 12 and 13, and the whole is so geared that the cutters will remove a portion of the plants, so as to leave the remainder in a suitable position in blocks.

By the use of this cultivator the rows of drilled plants may be blocked readily and quickly, leaving the same in position to produce the best results in the growing crop.

We have shown and described our preferred form of blocking device; but it is evident that changes may be made without departing from the true invention.

Having thus described our invention, what we claim to have invented, and desire to secure by Letters Patent, is—

1. In a wheeled cultivator having a fixed main frame, a revolving shaft having adjustable cutters movably supported in the main frame, frames connected to the said main frame and to one end of the shaft for automatically adjusting the latter, and means for maintaining said shaft in an adjusted position.

2. In a wheeled cultivator having a main frame, a rotatable shaft having cutters, frames having one of their ends connected to the main frame and the other ends slidably connected thereto, said shaft supported in the main and slidable frame for automatically adjusting the same, shoes on said slidable frames, and a flexible means for positive adjustment of said shaft.

In testimony whereof we have hereunto set our hands in presence of two subscribing witnesses.

WARREN S. FRARY.
JULIUS L. KNIEPER.

Witnesses:
EDWARD TAGGART,
MARY S. TOOKER.